(12) United States Patent
Gampp (10) Patent No.: US 6,418,246 B1
(45) Date of Patent: Jul. 9, 2002

(54) LATERAL TRENCHING FOR CROSS COUPLING SUPPRESSION IN INTEGRATED OPTICS CHIPS

(75) Inventor: Lorrie L. Gampp, Reseda, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/471,720

(22) Filed: Dec. 23, 1999

(51) Int. Cl.⁷ .................................................. G02B 6/12
(52) U.S. Cl. .............................. 385/14; 385/15; 385/8; 385/9; 385/10; 385/11; 385/12; 385/13
(58) Field of Search ........................... 385/14, 15, 8–13, 385/39–45, 50–51, 1–3

(56) References Cited

U.S. PATENT DOCUMENTS

| | | |
|---|---|---|
| 4,976,506 A | 12/1990 | Pavlath |
| 5,046,808 A | 9/1991 | Chang |
| 5,193,136 A | 3/1993 | Chang et al. |
| 5,321,779 A | 6/1994 | Kissa |
| 5,393,371 A | 2/1995 | Chang |
| 5,442,719 A | 8/1995 | Chang |
| 5,793,093 A | * 8/1998 | Warwick ..................... 257/510 |

FOREIGN PATENT DOCUMENTS

EP  0 806 685 A1  11/1997

* cited by examiner

Primary Examiner—Mohammad Sikder
(74) Attorney, Agent, or Firm—Lynn & Lynn (57) ABSTRACT

An optical waveguide network is formed in a substrate of an electrooptically active material. The optical waveguide has input and output facets where optical signals may be input to and output from the integrated optics chip. At least one lateral trench is formed in the substrate. The lateral trench is arranged to prevent light rays incident thereon from inside the substrate from propagating to the output facet. The lateral trench may be formed as a slot that extends toward the surface of the substrate where the optical waveguide network is formed, or the trench may be parallel to the plane of the optical waveguides. The trench may be formed in a surface that is either parallel or perpendicular to the plane of he optical waveguide network,

13 Claims, 4 Drawing Sheets

LATERAL TRENCHING FOR CROSS COUPLING SUPPRESSION IN INTEGRATED OPTICS CHIPS

BACKGROUND OF THE INVENTION

This invention relates generally to the field of integrated optics chips or devices and more particularly to the field of multifunction integrated optics chips such as those having integrated optic components formed in lithium niobate (LiNbO$_3$) substrates. Integrated optics components formed on such chips include waveguides that may be arranged to function such as polarizers, optical couplers and phase modulators. Multiple functions may be incorporated on a single device, which eliminates losses and errors associated with interfacing separate devices. This invention is particularly directed to methods and apparatus for reducing polarization non-reciprocity errors in a multifunction integrated optics chip as a result of scattered wave propagations. which can cross couple into the fibers which are pigtailed to the optical waveguides.

Multifunctional Integrated Optical Chips (MIOC's) are usually fabricated in large numbers on three to four inch wafers of lithium niobate (LiNbO$_3$) using conventional photomasks, vacuum deposition, chemical baths, proton exchange, diffusion, and etching techniques to form large numbers of identical components at low cost and with high reliability. MIOC's capable of performing the aforementioned functions are used in fabricating middle and high accuracy fiber optic gyroscopes (FOG's) or rotation sensors. The FOG uses the Sagnac effect to measure rates of rotation about an axis perpendicular to a coil of optical fiber. MIOC's may also be used in forming other fiber optic sensors such as hydrophones and geophones that rely on the principles of the Mach-Zehnder or Michelson interferometer.

A fiber optic gyroscope includes means for introducing counterpropagating waves from an optical signal source into an optical fiber coil. Rotation of the coil about an axis perpendicular to the plane of the coil produces a phase difference between the clockwise and counter-clockwise wave via the Sagnac effect. The phase shift occurs because waves that traverse the coil in the direction of the rotation have a longer transit time through the optical fiber coil than waves that traverse the coil in the opposite direction. The waves are combined after propagating through the coil. This combination of waves produces an interference pattern that may be processed to determine the rate of rotation. Techniques for determining the rotation rate are well-known in the art.

It is common practice to form a FOG to include a multifunctional integrated optics chip (MIOC) between the optical signal source and the optical fiber coil, which is typically formed of polarization maintaining fiber. The MIOC typically includes a plurality of optical waveguides arranged to form a Y-junction. The base of the Y-junction is connected to the optical signal source while the arms of the Y-junction are interfaced with ends of the optical fiber coil. Optical signals input to the multifunctional integrated optics chip divide at the Y-junction to form optical signals that are input to the ends of the optical fiber coil as the counter-propagating waves. After propagating through the coil, the waves enter the optical waveguides that form the arms of the Y-junction. The waves then combine in the Y-junction and are output from the base of the Y-junction to an optical fiber. The combined waves are guided to a photodetector that produces an electrical signal that is processed to determine the rotation rate.

The desired condition in a fiber optic rotation sensor is the transverse electric (TE) mode propagating in the optical fiber coil and in the optical waveguides without added path lengths. Propagation of transverse magnetic (TM) modes and TE modes having added path lengths are undesired conditions. Error sources such as polarization cross coupling, which adds a phase shift (or polarization non-reciprocity, PNR, which is associated with always having two polarization components possible in the fiber at all times), manifest themselves as additional optical path differences in direct competition with the Sagnac effect. These error sources cause phase bias and amplitude bias errors when they are modulated at the frequency used by the phase modulators in the MIOC. The bias component in the fiber optic rotation sensor due to polarization cross coupling is inversely proportional to the square root of the absolute value of the polarization extinction ratio. Extinction ratio is defined as ten times the logarithm of the ratio of the undesired power (the power of the undesired mode) to the desired power (the power of the desired mode) of the polarization modes expressed in decibels. Minimizing cross coupling (maximizing the absolute value of the extinction ratio) in the MIOC reduces this type of bias error.

As further background, integrated optics chips (IOC's), such as those disclosed herein, may be formed using processes and steps similar to some of those disclosed in U.S. Pat. No. 5,193,136, which issued to Chin L. Chang et al. on Mar. 9, 1993 for PROCESS FOR MAKING MULTIFUNCTION INTEGRATED OPTICS CHIPS HAVING HIGH ELECTRO-OPTIC COEFFICIENTS; U.S. Pat. No. 5,046,808, which issued to Chin L. Chang on Sep. 10, 1991 for INTEGRATED OPTICS CHIP AND METHOD OF CONNECTING OPTICAL FIBER THERETO; U.S. Pat. No. 5,393,371, which issued to Chin L. Chang et al. on Feb. 28, 1995 for INTEGRATED OPTICS CHIPS AND LASER ABLATION METHODS FOR ATTACHMENT OF OPTICAL FIBERS THERETO FOR LiNbO$_3$ SUBSTRATES; U.S. Pat. No. 5,442,719, which issued to Chin L. Chang et al. on Aug. 15, 1995 for ELECTRO-OPTIC WAVEGUIDES AND PHASE MODULATORS AND METHODS FOR MAKING THEM; and U.S. Pat. No. 4,976,506, which issued to George A. Pavlath on Dec. 11, 1990 for METHODS FOR RUGGED ATTACHMENT OF FIBERS TO INTEGRATED OPTICS CHIPS AND PRODUCT THEREOF.

Each of the foregoing patents is assigned to Litton Systems, Inc. of Woodland Hills, Calif. Each of the foregoing patents cited above is incorporated herein by reference for the purpose of providing those skilled in the art with background information on how integrated optics chips (IOCs) or multifunctional integrated optical chips are made.

If the gyro bias is significantly reduced, there is the potential to reduce the fiber costs by replacing polarization maintaining fiber with less expensive single mode fiber, or using a shorter length of polarization maintaining fiber than is presently used.

SUMMARY OF THE INVENTION

An integrated optics chip according to the present invention comprises an optical waveguide network formed in a substrate of an electrooptically active material. The optical waveguide has input and output facets where optical signals may be input to and output from the integrated optics chip. At least one lateral trench is formed in the substrate. The lateral trench is arranged to prevent light rays incident thereon from inside the substrate from propagating to the output facet.

The lateral trench may be formed to extend toward the surface of the substrate where the optical waveguide network is formed. The trench is formed as a slot that makes an acute angle with first surface. The trench may be formed in a surface that is either parallel or perpendicular to the plane of the optical waveguide network.

The lateral trench preferably extends completely across the width of the substrate and extends into the substrate to a depth that is about 75% to 95% of the substrate depth. The endpoint of the lateral trench preferably is located at a distance along the length of the substrate about 10% to 30% of the length of the substrate from an end thereof.

The integrated optics chip according to the present invention may include a second trench that is formed in the substrate to be symmetrical with the first trench.

A light absorbing material may be placed in the lateral trenches.

An appreciation of the objectives of the present invention and a more complete understanding of its structure and method of operation may be had by studying the following description of the preferred embodiment and by referring to the accompanying drawings.

DETAILED DESCRIPTION OF THE INVENTION

None of the drawings included with this disclosure are to scale. Some of the dimensions of components included in the drawings are so small that they must be shown in an enlarged scale relative to other components.

Figure 1A:
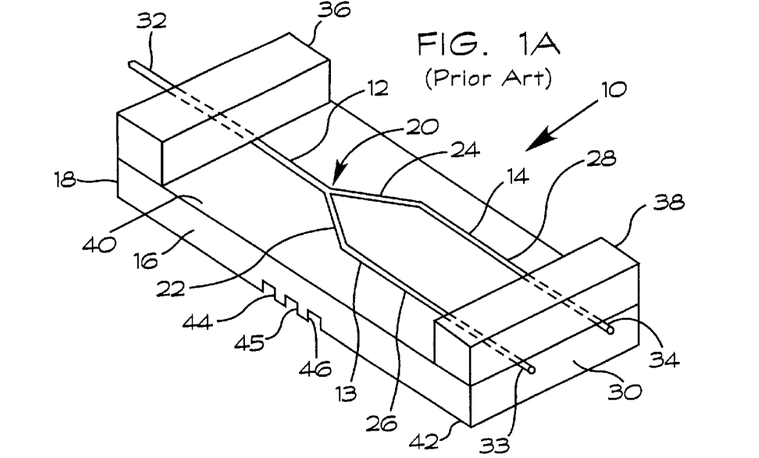
FIG. 1A is a perspective view of a prior art MIOC.

FIG. 1A illustrates a first prior art MIOC 10 that includes three optical waveguides 12–14 formed on a substrate 16. The substrate 16 is formed of an electrooptically active material such as lithium niobate, $LiNbO_3$, which is ordinarily used in forming such devices. The optical waveguides 12–14 are formed by doping portions of the substrate 16 using processes that are well-known in the art.

The optical waveguide 12 extends from an edge 18 of the substrate 16 to a Y-junction 20 where the optical waveguides 12–14 intersect. The optical waveguides 13 and 14 have angled portions 22 and 24, respectively, that extend between the Y-junction 20 and parallel portions 26 and 28. The optical waveguides 13 and 14 extend between the Y-junction 20 and an edge 30 of the substrate 16, the end faces 18, 30 being generally parallel.

The optical waveguides 12–14 are formed such that optical fibers 32–34, respectively, may be butt-coupled to them to interface the MIOC 10 with other components (not shown). To facilitate describing both the prior art and the invention, the optical fiber 32 is subsequently referred to as the input fiber pigtail 32, and the optical fibers 33 and 34 are referred to as the output fiber pigtails 33 and 34.

A pair of feet 36 and 38 are mounted on the upper surface 40 of the substrate 16 near the end faces 18 and 30, respectively.

The MIOC 10 is designed to block single bounce reflections off the lower surface 42 of the substrate 16. For example, if an optical signal is input to the MIOC 10 from the input fiber pigtail 32, most of the signal input propagates in the optical waveguide 12 to the Y-junction 20, coupling to the optical waveguides 13 and 14 which in turn couple through the output fiber pigtails 33 and 34. However, a small portion of the signal from the input fiber pigtail 32 propagates in the substrate 16. There is an angle of incidence for light that reflects from the lower surface 42 of the substrate 16 for which the reflected ray propagates to the output fiber pigtails 33 and 34, which are coupled to the optical waveguides 13 and 14. The angle depends upon the dimensions of the MIOC 10 and is easily calculated once the length and thickness of the MIOC are known. Typical MIOC substrates 16 are about 26 to 28 mm long, 2 mm wide and 1 mm thick.

Figure 1B:
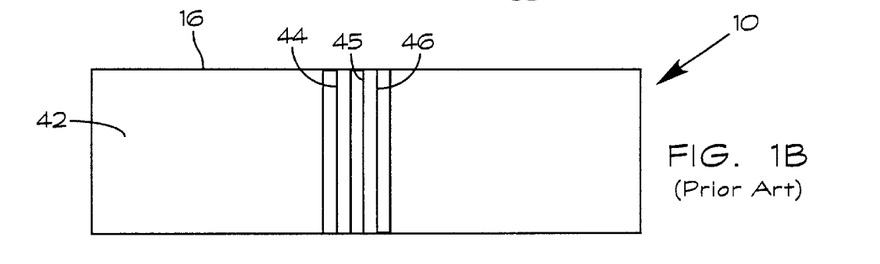
FIG. 1B is a bottom plan view of the MIOC of FIG. 1A.
Figure 1C:
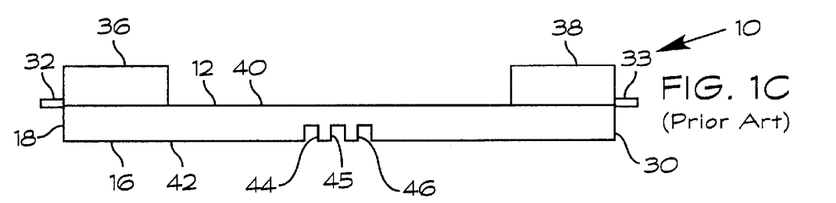
FIG. 1C is a side elevation view of the MIOC of FIGS. 1A and 1B.
Figures 2A, 2B:
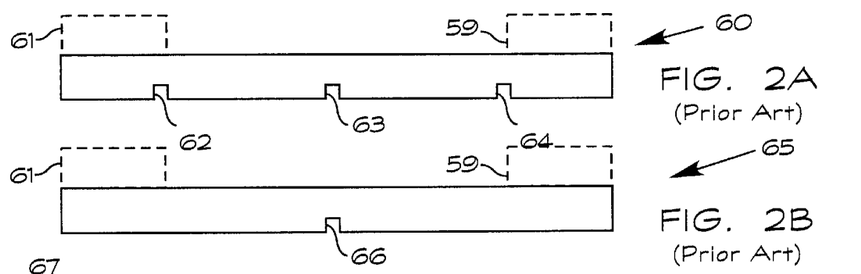
FIG. 2A is a side elevation view illustrating a prior art MIOC designed to block single and triple bounce reflections.
FIG. 2B is a side elevation view illustrating prior art MIOC designed to block single bounce reflections.
Figure 2C:
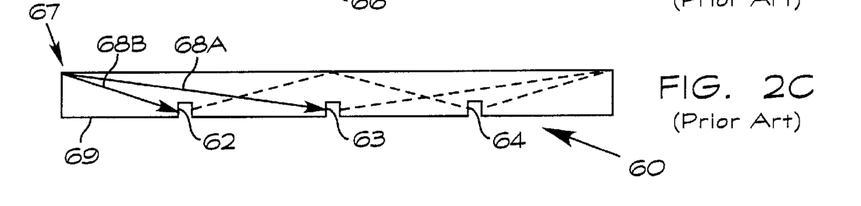
FIG. 2C is a side elevation view illustrating a prior art MIOC designed to block single and triple bounce reflections, additionally it shows the ray paths for single and triple bounce reflections.

Ray paths having a single reflection from the lower surface 42 are blocked by three shallow trenches, or grooves, 44–46 formed in the MIOC. These trenches 44–46 are located in the central region of the substrate 16 and are located in the region where a ray would have to reflect to reach the pigtail at the opposite end of the MIOC 10. As shown in FIGS. 1–2C, the trenches 44–46 are parallel, and they extend across the substrate 16 in a direction approximately perpendicular to the optical path defined by the optical waveguides 12–14. Typically the trenches are 0° to 15° from perpendicular to the optical path defined the optical waveguides 12–14. The trenches 44–46 typically extend about 50 to 300 microns from the lower edge 42 into the substrate 16. Typically the trenches 44–46 have depths that are significantly less than half the height of the substrate 16. The trenches 44–46 may be filled with a substance such as India ink to enhance suppression of undesired light rays.

A light ray that is incident upon a side of one of the trenches 44–46 is reflected at an angle that will not allow the ray to reach the pigtail, input or output 32–34, of the MIOC 10. Part of the light may also be absorbed. The MIOC 10 has an extinction ratio in the range of about −55 to −65 dB.

FIG. 2A illustrates a MIOC 60 having three trenches 62–64 equally spaced apart at the ¼, ½ and ¾ points with respect to the length of the MIOC 60. FIG. 2B shows still another type of prior art MIOC 65 having a single trench 66 at the center bottom region. Both of these designs can be fabricated with or without feet 59 and 61.

FIG. 2C illustrates rays 68A and 68B propagating from an input facet 67 of the MIOC 60 toward the bottom surface 69. The trench 62 blocks the ray 68B, and the trench 63 blocks the ray 68A. Again, this design can be fabricated with or without feet 59 and 61.

Figure 3:
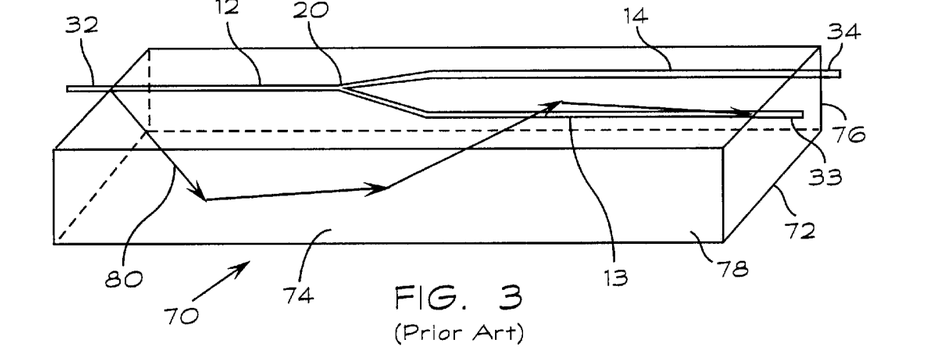
FIG. 3 is a top perspective view of a prior art MIOC showing reflected light waves in a substrate.

FIG. 3 is a perspective view of a prior art MIOC 70 illustrating reflection of ray paths from the bottom 72 and sides 74 and 76 of a substrate 78. A ray 80 enters the substrate 78 at the interface between the input fiber pigtail 32 and the optical waveguide 12. The ray 80 first reflects from the near side 74 toward the bottom 72. The ray reflects from the bottom to the far side 76, which reflects the ray to the output pigtail 33. Such reflections are not blocked by the prior art trenches, degrade the polarization extinction ratio and contribute PNR as described above.

The prior does not address reflections from the sides or reflections involving both the sides and bottom of the chip combined. The prior art addresses only the two simplest optical paths for scattered light starting at one pigtail interface and ending at an opposite pigtail.

It has been discovered that further improvement in the MIOC extinction ratio requires blocking of rays other than these two simplest ray paths which make single and triple bounces off the top 40 and bottom 42 surfaces of the substrate 16.

Figure 4:
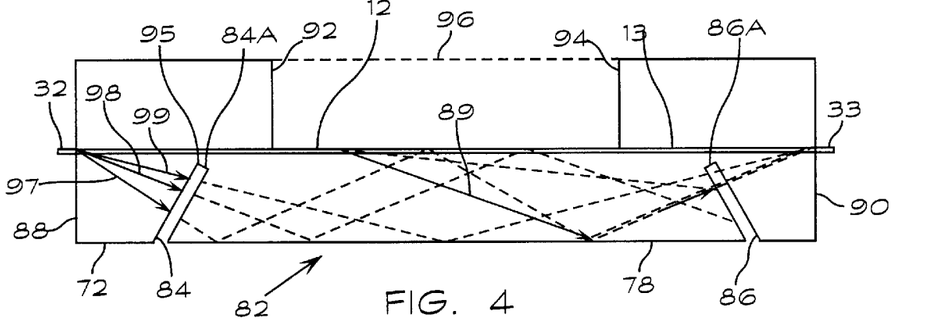
FIG. 4 is a side view showing a first embodiment of a MIOC having a pair of angled lateral trenches according to the present invention.
Figure 5:
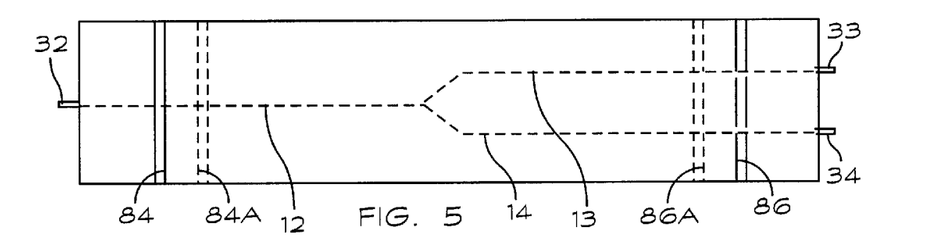
FIG. 5 is a bottom plan view of the MIOC of FIG. 4.

FIGS. 4 and 5 illustrate a MIOC according to the present invention. FIG. 4 is a side view of a MIOC 82, and FIG. 5 is a bottom plan view. The MIOC 82 includes the optical waveguides 12–14 (the optical waveguide 14 is not visible in the side view) formed in a substrate 78 and arranged as described above. The fiber pigtails 32–34 are attached to the MIOC 82 as previously described.

The MIOC 82 includes a pair of angled lateral trenches 84 and 86. As shown in FIG. 5, the trenches 84 and 86 extend approximately perpendicularly across the width of the substrate 78. As shown in FIG. 4, the trench 84 begins near an end 88 of the substrate 78 and extends at an angle toward the optical waveguide 12. The trench 84 preferably is an angle of about 60° counterclockwise from the plane of the bottom surface 72. The bottom 84A (dashed lines in FIG. 5) of the trench 84 is displaced toward the center of the substrate 78 from the opening at the bottom surface 72. The trench 86 is arranged to be symmetrical with the trench 84. Accordingly, the trench 86 begins near an end 90 of the substrate 78 and extends toward the optical waveguides 13 and 14 at an angle of about 120° counterclockwise from the plane of the bottom surface 72. The bottom 86A (dashed lines in FIG. 5) of the trench 86 is displaced toward the center of the substrate 78 from the opening at the bottom surface 72.

The solid line arrows emanating from the optical waveguide 12 in FIG. 4 indicate light rays 97–99 that have scattered into the substrate 78 near the input pigtail 32. The arrow 89 indicates a light ray that has scattered from a scattering site in the optical waveguide 12. Scattered light can reflect from the surfaces of the substrate 78 in the manner shown in FIG. 3. However, the angled trenches 84 and 86 block nearly all such rays. A light ray, such as those represented by rays 89, 97, 98, 99, that is incident upon the trench 84 or the trench 86 is reflected at an angle that will not allow the ray to reach the pigtail, input or output 32–34, of the MIOC 82. Part of the light may also be absorbed by an absorbing material such as India ink placed in the trenches 84 and 86. The MIOC 82 has an extinction ratio in the range of about −70 to −82 dB.

The dashed arrows in FIG. 4 indicate the paths that rays would have followed to the output pigtails 33 and 34 but for the blocking action of the angled trenches 84 and 86.

The trenches 84 and 86 preferably have widths of about 0.003 in. to 0.012 in. and extend into the substrate 78 to a vertical depth, measured perpendicularly from the bottom surface 72 of the substrate 78 towards the uppermost point of the trench 95, of about 750 to 850 microns. Therefore, the depth of the trenches 84 and 86 is preferably about 75% to 85% of the thickness of the substrate 78. However, the depth of the trench can be as deep as 95% of the thickness of the substrate.

The MIOC 82 may include either a pair of feet 92 and 94 mounted on the substrate 78 near the end faces 88, 90, respectively, or the MIOC may include a full-length cover 96 (shown in dashed line) which extends fully from ends 88 to 90. The feet 92 and 94 or the cover 96 are used to provide mechanical strength to the MIOC 82, which would otherwise be fragile because of the depth of the angled lateral trenches 84 and 86.

Figure 6:
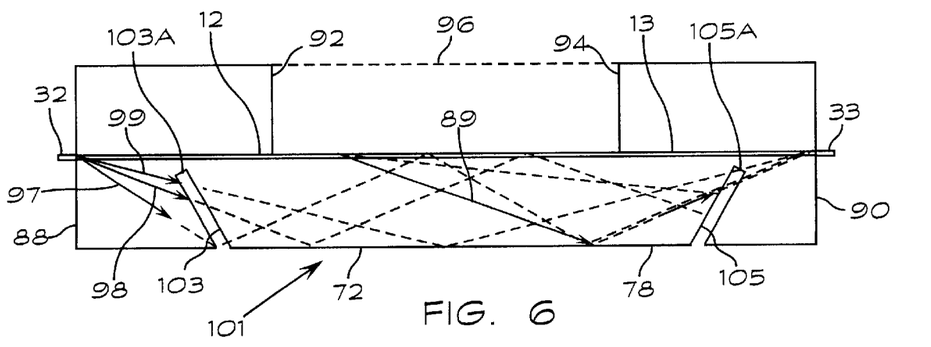
FIG. 6 is a side view showing a second embodiment of a MIOC according to the present invention.

FIG. 6 illustrates a MIOC 101 that is similar to the MIOC 82. The only difference is that the MIOC 101 has trenches 103 and 105 that angle away from one another generally toward the input and output pigtails, respectively, whereas the trenches 84 and 86 angle away from the pigtails.

Figures 7A, 7B:
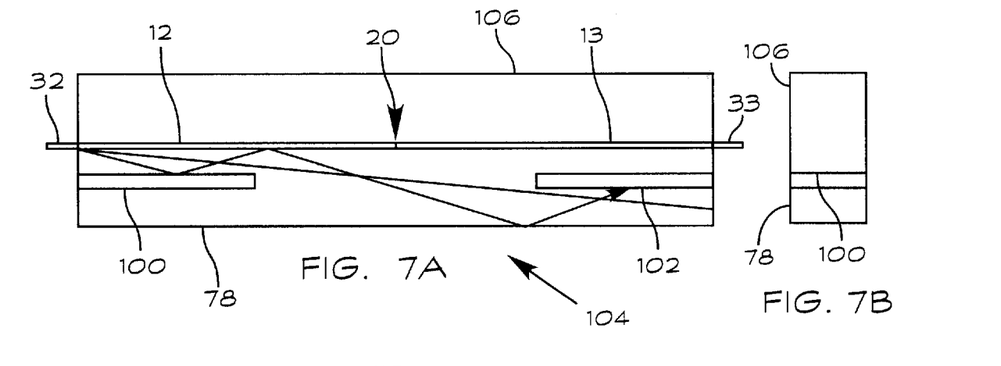
FIG. 7A is a side view showing a third embodiment of a MIOC according to the present invention.
FIG. 7B is an end view of the MIOC of FIG. 7A.

FIGS. 7A and 7B illustrate an embodiment of the invention that includes a pair of lateral trenches 100 and 102 in the substrate 78 of a MIOC 104. The trenches 100 and 102 are approximately parallel to the plane of the base of the substrate 78. The MIOC 104 includes a full length cover 106 to provide structural integrity.

Figure 8:
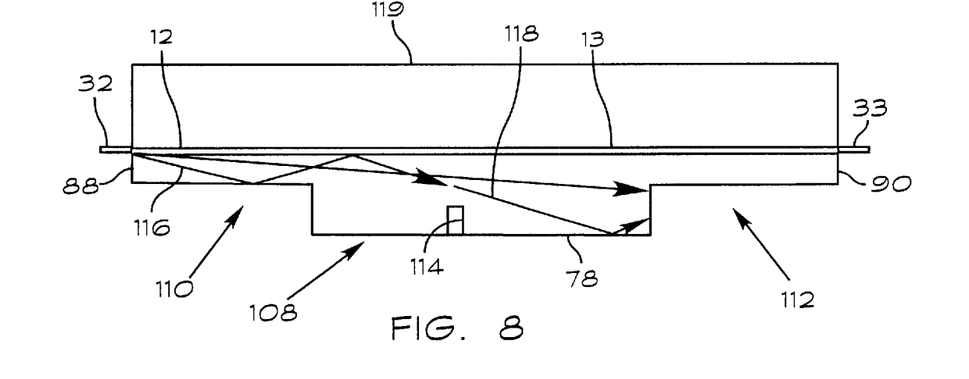
FIG. 8 is a side view showing a fourth embodiment of a MIOC according to the present invention.
Figure 9:
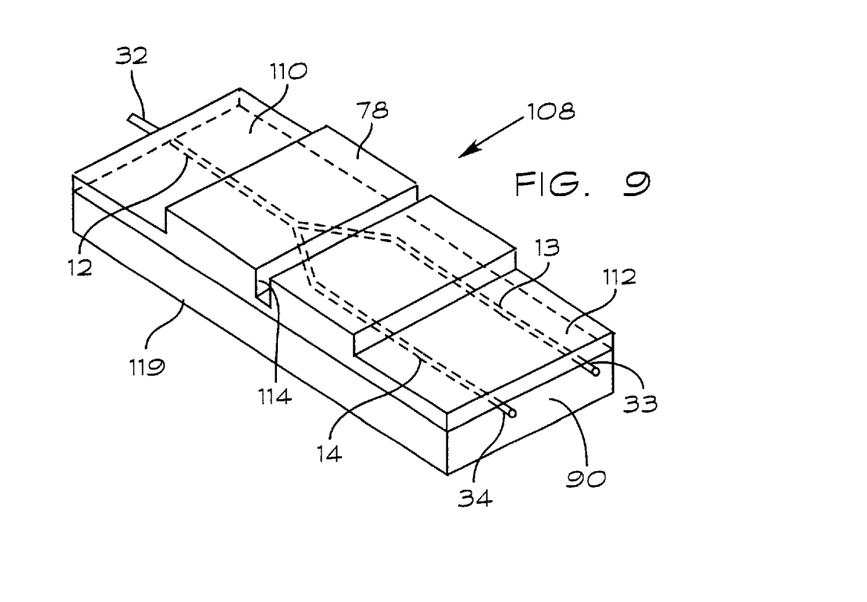
FIG. 9 is a bottom perspective view of the MIOC of FIG. 8.

FIGS. 8 and 9 illustrate another embodiment of the invention having lateral trenches. A MIOC 108 includes the optical waveguides 12–14 (the optical waveguide 14 is not visible in the side view) formed in the substrate 78 and arranged as described above. The fiber pigtails 32–34 are attached to the MIOC 108 as previously described. A pair of lateral trenches 110 and 112 are formed by removing rectangular portions of the substrate 78 near the end faces 88, 90. The MIOC 108 may also have a central trench 114.

FIG. 8 shows two rays 116 and 118 propagating in the substrate 78. The ray 116 reflects off the top of the end trench 110 to the top of the substrate 78. The ray 116 misses the central trench 114, but it impinges upon the trench 112 and is blocked. Ray 118 is also blocked by trench 112. There may also be absorption of the light if an absorbing material such as India ink is used on the surface of the trenches 110 and 112. The MIOC 108 also includes a full length cover 119.

Figure 10:
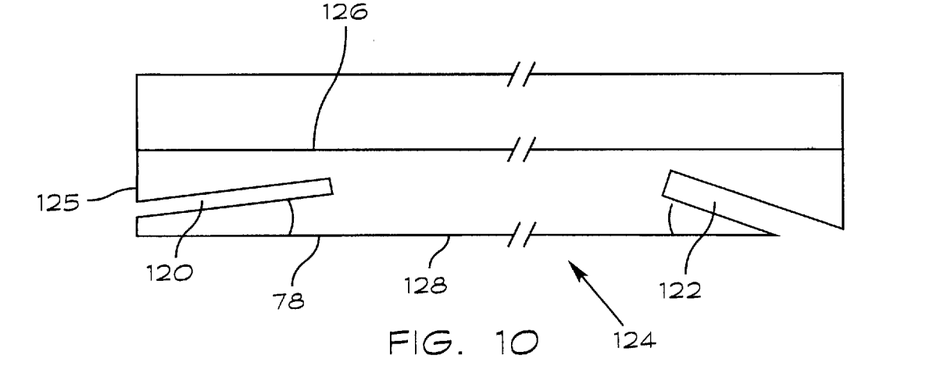
FIG. 10 is a side view showing a fifth embodiment of a MIOC according to the present invention.

FIG. 10 shows an embodiment of the invention having two angled lateral trenches 120 and 122 formed in the substrate 78 of a MIOC 124. The trenches 120 and 122 both preferably extend completely across the width of the substrate 78. Additionally the preferred embodiment would have symmetric trenches of either trench type 120 or 122. The trench 120 extends from an edge 125 of the substrate and angles upward toward the upper surface 126. The trench 122 begins at the bottom surface 128 of the substrate 78 and angles toward the upper surface 126. Angles of about 30° or 60° from the plane of the base of the substrate 128 are preferred for the angled lateral trenches 120 and 122. The preferred depths are the same as described above for FIG. 4.

Figure 11:
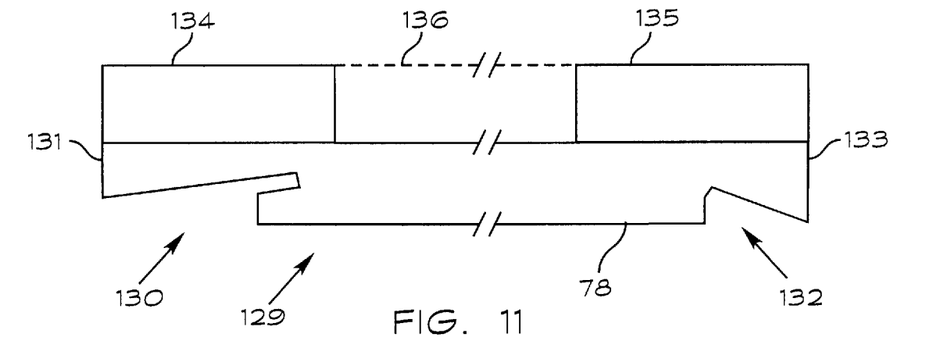
FIG. 11 is a side view showing a sixth embodiment of a MIOC according to the present invention.

FIG. 11 shows still another embodiment of the invention having a pair of angled lateral trenches 130 and 132 formed in the substrate 78 of a MIOC 129. The trenches 130 and 132 are angled lateral trenches of FIG. 10 plus the removal of an additional wedge shape below the trench extending towards or including a portion of the base of the substrate 78. Additionally the preferred embodiment would have symmetric trenches of either trench type 130 or 132. The preferred depths are the same as described above for FIG. 4. This design can have either a full cover design (indicated with the dashed line between the feet 136) extending from end face 131 to end face 133 or feet 134, 135 located near the ends 131 and 133 of substrate 78.

Figure 12:
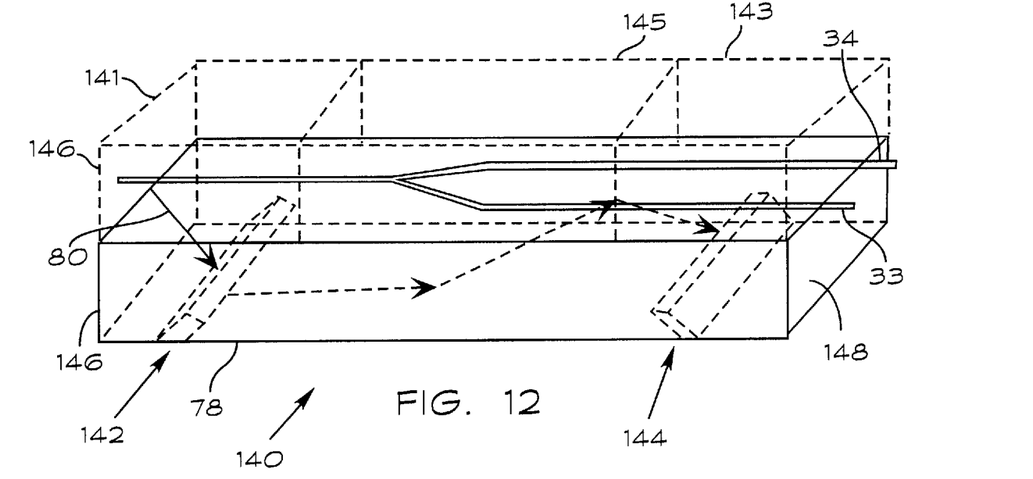
FIG. 12 is perspective view showing blocked ray paths of the first embodiment as shown in FIG. 4.

FIG. 12 is a perspective view showing a MIOC 140 according to the present invention having angled lateral trenches 142 and 144 near the ends 146 and 148 of the substrate 78. The trenches 142 and 144 are at angles to both the side and bottom surfaces of the substrate 78. The preferred embodiment has the base of the trench approximately parallel to the end faces 146, 148, all of which are at an angle of 0–15 degrees from the perpendicular with respect to the waveguide(s) 12–14 in the substrate surface above the trenches. Additionally this shows how a ray 80 is blocked by the trench 142 from continuing to bounce off the sides and bottom of the substrate 78 and coupling into an output pigtail 33. Reference FIG. 3 for the same ray path shown continuing and coupling to the output pigtail 33 due to lack of angled lateral trenches. Either a full cover 145 extending from end face 146 to end face 148 or two feet 141, 143 located near the ends 146, 148 are required for structural integrity of the MIOC 140.

The MIOC structures of the present invention are designed to extinguish or trap the various light paths that could potentially cross couple through reflections off the top, bottom and sides of an integrated optics chip. The trench locations and angles are selected so that light rays from the input pigtail are not incident on the trenches perpendicular to a surface of the trench. Such rays would be at least partially reflected back into the pigtails instead of absorbed or trapped.

TE and TM modes are possible in single, double, and triple bounce ray paths. Additionally, surface or subsurface scatter points along the waveguides could result in added ray paths for TE mode cross coupling. The present invention utilizes a trench that is perpendicular or at an angle to the sides of the chip and parallel or at an angle to the base of the chip. This invention does not require a full cover for integrity, but would require at least a "foot."

The trench designs included in the present invention both block light and trap light between the trench and the surfaces of the substrates. The angled lateral trench design also provides a minimal surface parallel to the chip surface which can result in reflections. These trenches are deeper than the prior art but do not approach the severe depth that vertical trenches require to achieve similar results. This trench is approximately three quarters the thickness of the material in depth, in the case of this particular device it is 750–850 $\mu$m deep vertically. The total depth of the device without the cover is 1000 microns. The present invention will block many more reflections than the prior art which typically utilizes 50–300 micron depth vertical trench(es). The optimal design length of the trench (the distance along the length of the chip) is dependent upon the total chip length, the substrate thickness, the IOC design tolerances, and the vertical placement of the trench with respect to the surface of the integrated optics chip. Additionally the trench does not have to pass through the entire width of the chip to block unwanted rays, although the added benefit of the trench traversing the entire width of the chip is that angled reflections from the side and bottom of the chip may also be trapped.

The design requires that the distance along the length of the chip of the lateral trench or angled lateral trench must be 12.5% to 25% of the total length of the chip when the vertical depth of the trench is at least 75% of the substrate thickness (not including a cover or "foot"). These calculations for the trench distance measured along the length of the chip would be somewhat different for a different vertical trench depth. This design traps the reflections from single and triple bounce patterns off the base. It also will trap light that may bounce off the end of the trench back to the top surface and down, thus preventing the light from reentering at the opposing pigtail. Reflections that involve both the side and the base and scattered light reflections from defects or sources along the waveguide will also be minimized. The angle of the lateral angled trenches could range from 15–75 degrees. However, angles close to 45 degrees should be avoided due to direct reflections back into the pigtails. It is recommended that angles near 30 and 60 degrees be used.

The location of these trenches, being near the ends of the chip, also adds the benefit of utilizing the existing foot for mechanical stabilization. The angled lateral trench design permits full use of the end face for pig-tailing, minimizes the reflective surface area and allows use of a "foot" or full cover design in the IOC. Additionally light may be absorbed if an absorbing material such as India ink is used in or on the surfaces of the trenches.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An integrated optics chip, comprising:
   a substrate formed of an electrooptically active material;
   an optical waveguide network formed on a first surface of the substrate, the optical waveguide network having an input facet arranged to receive an optical signal input to the optical waveguide network and an output facet arranged to provide an optical signal output from the optical waveguide network; and
   the substrate having a lateral trench formed therein, the lateral trench being arranged to prevent light rays incident thereon from inside the substrate from propagating to the output facet, wherein the lateral trench extends toward the first surface from a second surface of the substrate a distance that is about 75% to 95% of the thickness of the substrate, the lateral trench being formed as a slot that makes an acute angle with first surface.

2. The integrated optics chip of claim 1 wherein the second surface is parallel to the first surface.

3. The integrated optics chip of claim 1 wherein the lateral trench extends completely across the substrate.

4. The integrated optics chip of claim 1 wherein the lateral trench ends at a distance along the length of the substrate about 10% to 30% of the length of the substrate from an end thereof.

5. The integrated optics chip of claim 4, further comprising a second lateral trench formed in the substrate so that it begins at a location about 70% to 90% of the length of the substrate from the end.

6. The integrated optics chip of claim 5 wherein the second trench is formed in the substrate to be symmetrical with the first trench.

7. The integrated optics chip of claim 1 further comprising a second lateral trench formed in the substrate to extend from an end surface of the substrate.

8. The integrated optics chip of claim 7 wherein the lateral trench is parallel to the first surface.

9. The integrated optics chip of claim 7 wherein the second lateral trench makes an acute angle with the first surface.

10. The integrated optics chip of claim 7 wherein the substrate has a predetermined length and the second lateral trench extends into the substrate a distance of about 10% to 30% of the predetermined length of the substrate.

11. The integrated optics chip of claim 7, further comprising a second lateral trench formed in the substrate symmetrically with the first lateral trench, the first and second lateral trenches extending from opposite ends of the substrate to depths of about 10% to 30% of the length of the substrate from the ends thereof.

12. The integrated optics chip of claim 1 wherein the lateral trench extends from an end and the bottom surface of the substrate a distance of about 10% to 30% of the substrate length.

13. The integrated optics chip of claim 1, further including a light absorbing material placed in the lateral trench.

* * * * *

UNITED STATES PATENT AND TRADEMARK OFFICE
CERTIFICATE OF CORRECTION

PATENT NO.     : 6,418,246 B1
DATED          : July 9, 2002
INVENTOR(S)    : Lorrie L. Gampp It is certified that error appears in the above-identified patent and that said Letters Patent is hereby corrected as shown below:

<u>Title page,</u>
Item [75], should read:

-- [75] Inventor     Lorrie L. Gampp, Reseda, CA (US) and
                        Arthur R. Martinez, Canoga Park, CA (US) --

Signed and Sealed this

Seventeenth Day of June, 2003

JAMES E. ROGAN
*Director of the United States Patent and Trademark Office*